(12) United States Patent
Fuldseth et al.

(10) Patent No.: US 10,003,807 B2
(45) Date of Patent: Jun. 19, 2018

(54) BLOCK-BASED VIDEO CODING USING A MIXTURE OF SQUARE AND RECTANGULAR BLOCKS

(71) Applicant: Cisco Technology, Inc., San Jose, CA (US)

(72) Inventors: Arild Fuldseth, Lysaker (NO); Gisle Bjontegaard, Oppegard (NO)

(73) Assignee: Cisco Technology, Inc., San Jose, CA (US)

( * ) Notice: Subject to any disclaimer, the term of this patent is extended or adjusted under 35 U.S.C. 154(b) by 142 days.

(21) Appl. No.: 14/918,771

(22) Filed: Oct. 21, 2015

(65) Prior Publication Data

US 2016/0373766 A1 Dec. 22, 2016

Related U.S. Application Data (60) Provisional application No. 62/182,852, filed on Jun. 22, 2015.

(51) Int. Cl.
| | | |
|---|---|---|
| *H04N 19/00* | (2014.01) | |
| *H04N 19/174* | (2014.01) | |
| *H04N 19/172* | (2014.01) | |
| *H04N 19/176* | (2014.01) | |
| *H04N 19/70* | (2014.01) | |
| *H04N 19/119* | (2014.01) | |

(Continued)

(52) U.S. Cl.
CPC ......... *H04N 19/174* (2014.11); *H04N 19/103* (2014.11); *H04N 19/119* (2014.11); *H04N 19/167* (2014.11); *H04N 19/172* (2014.11); *H04N 19/176* (2014.11); *H04N 19/70* (2014.11)

(58) Field of Classification Search
CPC .......................... H04N 19/103; H04N 19/119
USPC ...................................... 375/240.01
See application file for complete search history.

(56) References Cited

U.S. PATENT DOCUMENTS

| | | |
|---|---|---|
| 8,208,742 B2 | 6/2012 | Cheon |
| 8,223,843 B2 | 7/2012 | Lee et al. |

(Continued)

FOREIGN PATENT DOCUMENTS

| | | |
|---|---|---|
| EP | 2739057 A1 | 6/2014 |
| WO | 2011160010 A1 | 12/2011 |

OTHER PUBLICATIONS

Yang et al., "CTB splitting on frame boundary for arbitrary resolution video", Joint Collaborative Team on Video Coding (JCT-VC) of ITU-T SG16 WP3 and ISO/IEC JTC1/SC29/WG11, Oct. 1, 2010, pp. 1-4.*

(Continued)

*Primary Examiner* — Jeffery Williams
(74) *Attorney, Agent, or Firm* — Edell, Shapiro & Finnan, LLC (57) ABSTRACT

A video decoding method is provided. The method includes receiving an encoded bit stream representative of a video signal, the encoded bit stream including information indicating partitioning of a frame of the video signal into blocks such that at least one rectangular block of any size occurs at any position of the frame. Information is obtained from the encoded bit stream, the information signaling at least one video coding parameter for the at least one rectangular block. The encoded bit stream of the video signal is decoded in accordance with the information for the at least one rectangular block. An analogous video encoding method is also provided.

24 Claims, 9 Drawing Sheets

(51) Int. Cl.
*H04N 19/103* (2014.01)
*H04N 19/167* (2014.01)

(56) References Cited

U.S. PATENT DOCUMENTS

| | | |
|---|---|---|
| 8,306,347 B2 | 11/2012 | Bjontegaard et al. |
| 8,335,261 B2 | 12/2012 | Karczewicz et al. |
| 8,446,959 B2 | 5/2013 | Lee et al. |
| 8,565,314 B2 | 10/2013 | Karczewicz et al. |
| 8,594,183 B2 | 11/2013 | Han et al. |
| 8,768,081 B2 | 7/2014 | Jung et al. |
| 8,780,993 B2 | 7/2014 | Lee et al. |
| 8,798,159 B2 | 8/2014 | Han et al. |
| 8,837,590 B2 | 9/2014 | Alshina et al. |
| 8,842,927 B2 | 9/2014 | Cheon et al. |
| 8,885,704 B2 | 11/2014 | Chien et al. |
| 8,885,723 B2 | 11/2014 | Lee et al. |
| 8,885,724 B2 | 11/2014 | Lee et al. |
| 8,885,725 B2 | 11/2014 | Lee et al. |
| 8,885,958 B2 | 11/2014 | Jung et al. |
| 8,938,006 B2 | 1/2015 | Lee et al. |
| 9,049,460 B1 | 6/2015 | Min et al. |
| 9,131,232 B2 | 9/2015 | Jung et al. |
| 2011/0243225 A1* | 10/2011 | Min ............ H04N 19/44 375/240.12 |
| 2011/0310976 A1 | 12/2011 | Wang et al. |
| 2012/0147971 A1 | 6/2012 | Chien et al. |
| 2012/0183074 A1 | 7/2012 | Fuldseth |
| 2013/0003871 A1 | 1/2013 | Bjontegaard et al. |
| 2013/0039422 A1 | 2/2013 | Kirchhoffer et al. |
| 2014/0003525 A1 | 1/2014 | Fuldseth |
| 2014/0029670 A1 | 1/2014 | Kung et al. |
| 2014/0056360 A1 | 2/2014 | Han et al. |
| 2015/0296217 A1* | 10/2015 | Song ............ H04N 19/119 375/240.02 |

OTHER PUBLICATIONS

International Search Report and the Written Opinion, PCT/US2016/038322, dated Aug. 3, 2016, 14 pages.

Kim et al., "Enlarging MB size for high fidelity video coding beyond HD", ITU-Telecommunications Standardization Sector Study Group 16 Question 6, Video Coding Experts Group (VCEG), Oct. 2010, pp. 1-6.

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

Lim et al., "Description of video coding technology proposal by SK telecom, Sejong Univ. and Sungkyunkwan Univ.", Joint Collaborative Team on Video Coding (JCT-VC) of ITU-T SG16 WP3 and OSO/IEC JTC1/SC29/WG11, Apr. 2010, pp. 1-41.

"Test Model under Consideration", Joint Collaborative Team on Video Coding (JCT-VC) of ITU-T SG16 WP3 and OSO/IEC JTC1/SC29/WG11, Apr. 2010, pp. 1-153.

"Text of ISO/IEC FDIS 14496-10; Information Technology-Coding of audio-visual objects—Part 10: Advanced Video coding", International Organisation for Standardisation Organisation Internationale De Normalisation ISO/IEC JTC 1/SC 29/WG 11 Coding of Moving Pictures and Audio, Mar. 31, 2003, 270 pages.

\* cited by examiner

┌─────────────────────────────┐
│ OBTAINING A FRAME OF A VIDEO SIGNAL │  410
│ TO BE ENCODED FOR TRANSMISSION │
└─────────────────────────────┘
              │
              ▼
┌─────────────────────────────┐
│ PARTITIONING THE FRAME INTO BLOCKS │  420
│ SUCH THAT AT LEAST ONE RECTANGULAR │
│ BLOCK OF ANY SIZE OCCURS AT ANY │
│ POSITION OF THE FRAME │
└─────────────────────────────┘
              │
              ▼
┌─────────────────────────────┐
│ INCLUDING IN AN ENCODED BIT STREAM │  430
│ INFORMATION SIGNALING AT LEAST ONE │
│ VIDEO CODING PARAMETER FOR THE AT │
│ LEAST ONE RECTANGULAR BLOCK │
└─────────────────────────────┘

BLOCK-BASED VIDEO CODING USING A MIXTURE OF SQUARE AND RECTANGULAR BLOCKS

CROSS REFERENCE TO RELATED APPLICATION

This application claims priority to U.S. Provisional Patent Application No. 62/182,852, filed Jun. 22, 2015, the entirety of which is incorporated herein by reference.

TECHNICAL FIELD

The present disclosure relates to video encoding and decoding technology.

BACKGROUND

Video encoding and decoding is used to transmit and receive video content over communication networks. There are continuous efforts being made in this technology to improve the quality of the video given the bandwidth of the communication channel over which the video streams are sent.

DESCRIPTION OF EXAMPLE EMBODIMENTS

Overview

In accordance with one embodiment, a video decoding method is provided. The method includes receiving an encoded bit stream representative of a video signal, the encoded bit stream including information indicating partitioning of a frame of the video signal into blocks such that at least one rectangular block of any size occurs at any position of the frame. Information is obtained from the encoded bit stream, the information signaling at least one video coding parameter for the at least one rectangular block. The encoded bit stream of the video signal is decoded in accordance with the information for the at least one rectangular block.

In accordance with another embodiment, a video encoding method is provided. The method includes obtaining a frame of a video signal to be encoded for transmission. The frame is partitioned into blocks such that at least one rectangular block of any size occurs at any position of the frame. Information is included in an encoded bit stream information signaling at least one video coding parameter for the at least one rectangular block.

DETAILED DESCRIPTION

Figure 1:
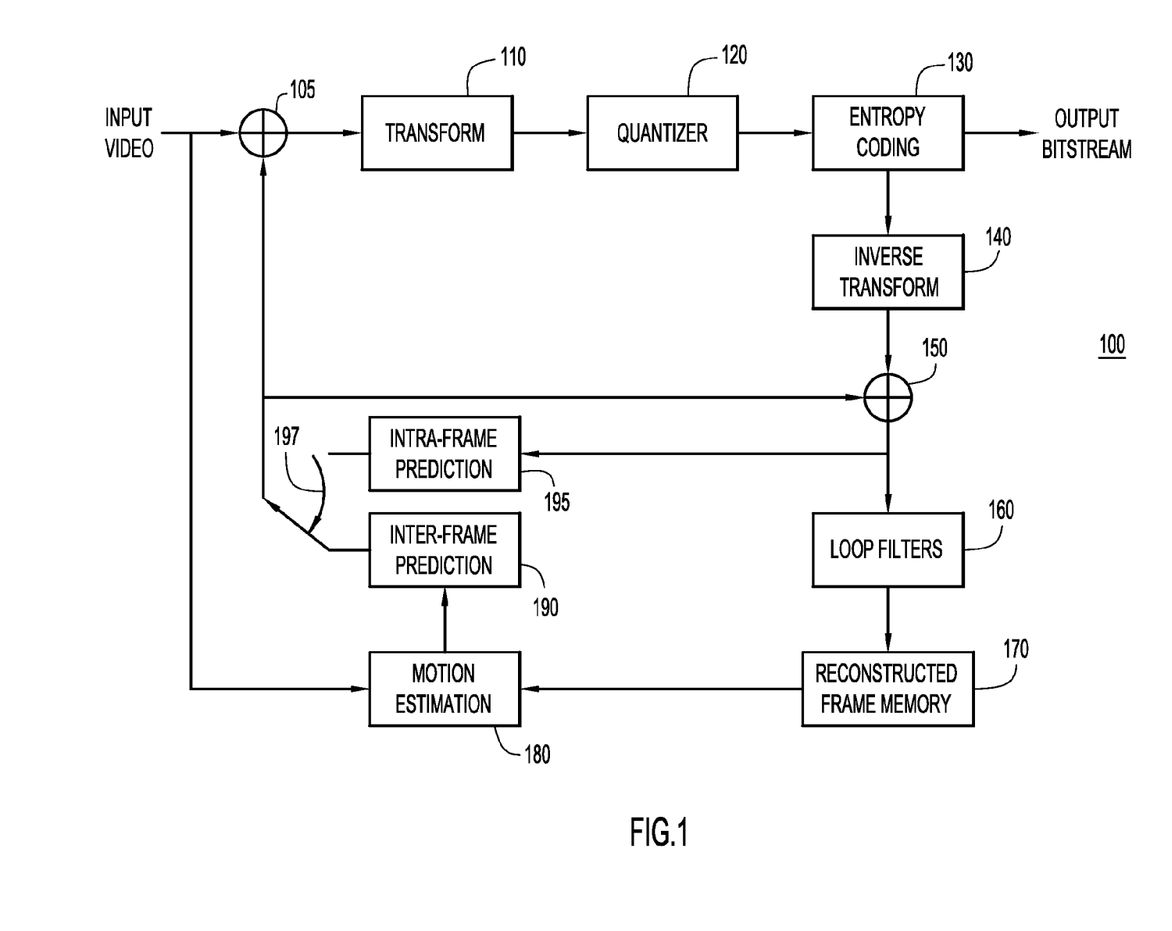
FIG. 1 is a block diagram of a video encoder according to an example embodiment.

Referring first to FIG. 1, a block diagram of a video encoder is shown at reference numeral 100. The video encoder 100 includes a subtractor 105, a transform unit 110, a quantizer unit 120, an entropy coding unit 130, an inverse transform unit 140, an adder 150, one or more loop filters 160, a reconstructed frame memory 170, a motion estimation unit 180, an inter-frame prediction unit 190, an intra-frame prediction unit 195 and a switch 197.

A current frame (input video) as well as a prediction frame are input to a subtractor 105. The subtractor 105 is provided with input from either the inter-frame prediction unit 190 or intra-frame prediction unit 195, the selection of which is controlled by switch 197. Intra-prediction processing is selected for finding similarities within the current image frame, and is thus referred to as "intra" prediction. Motion compensation has a temporal component and thus involves analysis between successive frames that is referred to as "inter" prediction. The motion estimation unit 180 supplies a motion estimation output as input to the inter-frame prediction unit 190. The motion estimation unit 180 receives as input the input video and an output of the reconstructed frame memory 170.

The subtractor 105 subtracts the output of the switch 197 from the pixels of the current frame, prior to being subjected to a two dimensional transform process by the transform unit 110 to produce transform coefficients. The transform coefficients are then subjected to quantization by quantizer unit 120 and then supplied to entropy coding unit 130. Entropy coding unit 130 applies entropy encoding in order to remove redundancies without losing information, and is referred to as a lossless encoding process. Subsequently, the encoded data is arranged in network packets via a packetizer (not shown), prior to be transmitted in an output bit stream.

The output of the quantizer unit 120 is also applied to the inverse transform unit 140 and used for assisting in prediction processing. The adder 150 adds the output of the inverse transform unit 140 and an output of the switch 197 (either the output of the inter-frame prediction unit 190 or the intra-frame prediction unit 195). The output of the adder 150 is supplied to the input of the intra-frame prediction unit 195 and to one or more loop filters 160 which suppress some of the sharpness in the edges to improve clarity and better support prediction processing. The output of the loop filters 160 is applied to a reconstructed frame memory 170 that holds the processed image pixel data in memory for use in subsequent motion processing by motion estimation block 180.

Figure 2:
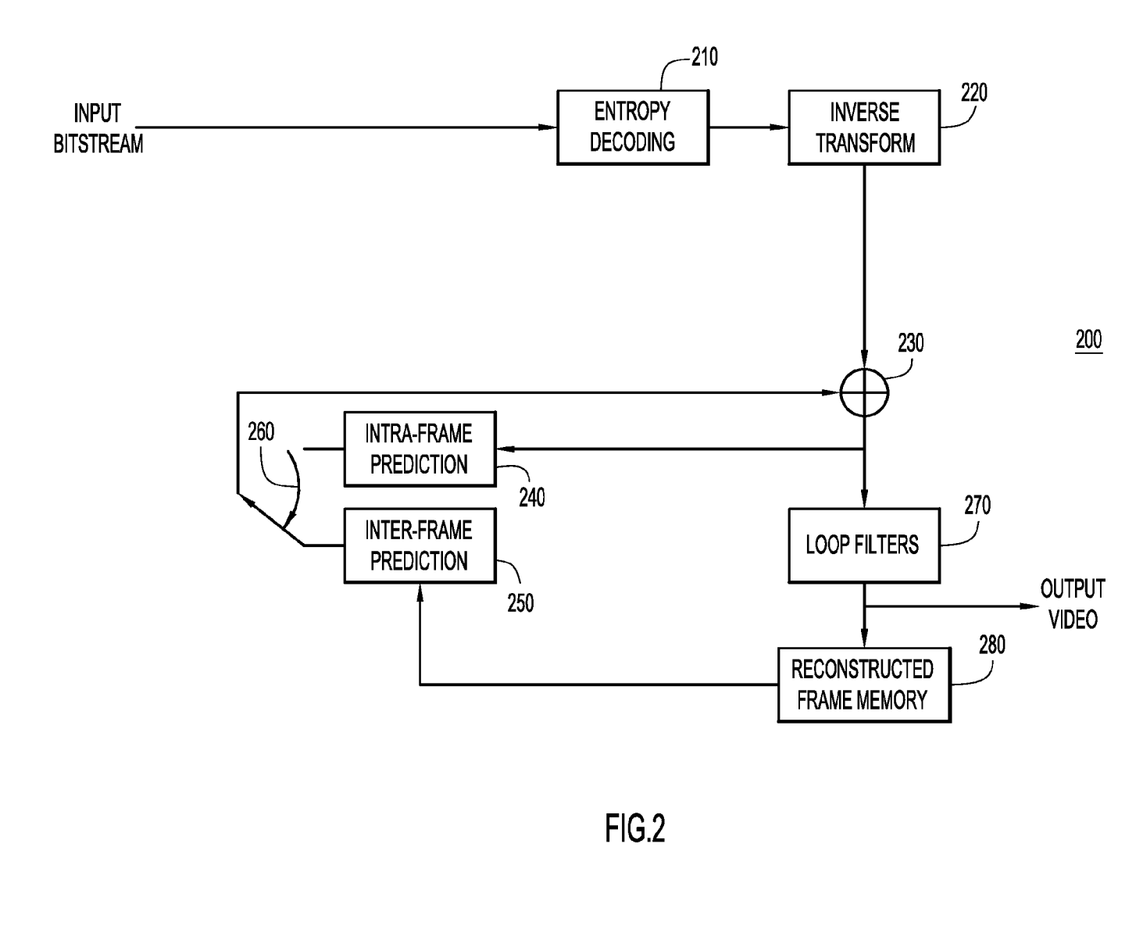
FIG. 2 is a block diagram of a video decoder according to an example embodiment.

Turning to FIG. 2, a block diagram of a video decoder is shown at reference numeral 200. The video decoder 200 includes an entropy decoding unit 210, an inverse transform unit 220, an adder 230, an intra-frame prediction unit 240, an inter-frame prediction unit 250, a switch 260, one or more loop filters 270 and a reconstructed frame memory 280. The entropy decoding unit 210 performs entropy decoding on the received input bitstream to produce quantized transform coefficients which are applied to the inverse transform unit 220. The inverse transform unit 220 applies two-dimensional inverse transformation on the quantized transform coefficients to output a quantized version of the difference samples. The output of the inverse transform unit 220 is applied to the adder 230. The adder 230 adds to the output of the inverse transform unit 220 an output of either the intra-frame prediction unit 240 or inter-frame prediction unit 250. The loop filters 270 operate similar to that of the loop filters 160 in the video encoder 100 of FIG. 1. An output video image is taken at the output of the loop filters 270.

The video encoder 100 of FIG. 1 and the video decoder of FIG. 2 may be implemented by digital logic gates in an integrated circuit (e.g., by an application specific integrated circuit) or by two or more separate logic devices. Alternatively, the video encoder 100 and video decoder 200 may be implemented by software executed by one or more processors, as described further in connection with FIG. 6, below.

Each of the functional blocks in FIGS. 1 and 2 are executed for each coding block, prediction block, or transform block.

Figure 3A:
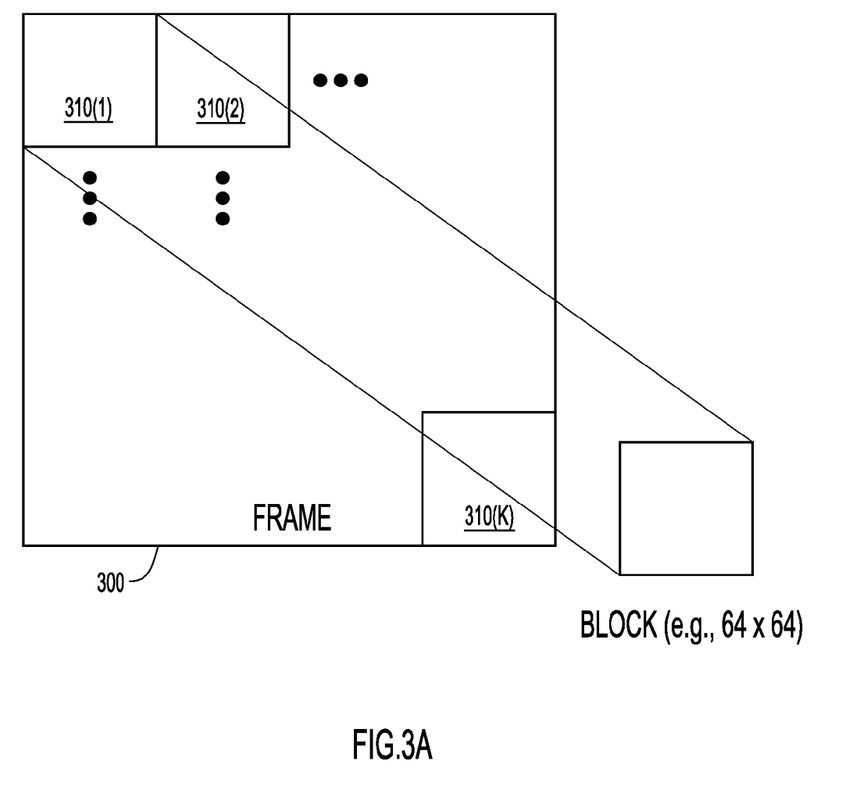
FIG. 3A illustrates partitioning of a video frame into blocks, according to an example embodiment.

FIGS. 3A-3D illustrate block partitioning techniques according to example embodiments. First, FIG. 3A illustrates a frame 300 of a video signal to be encoded for transmission to a destination. Each frame 300 is divided into N×N blocks 310(1)-310(K) of a predetermined size, such as 64×64. The blocks 310(1)-310(K) are processed in raster-scan order.

Figure 3B:
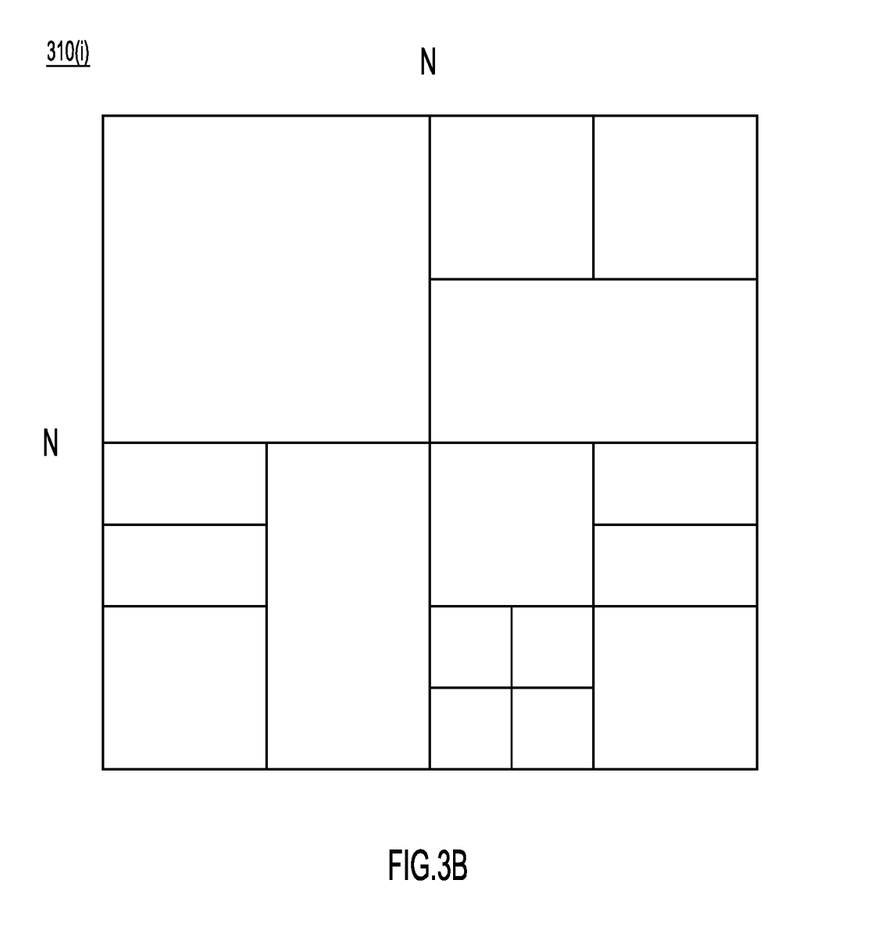
FIG. 3B illustrates hierarchical block partitioning of a video frame, according to an example embodiment.

Turning to FIG. 3B, an N×N block, shown generically at reference numeral 310(i), can be divided into sub-blocks using a hierarchical quad-tree structure. The smallest sub-block size is 8×8. The sub-blocks may be referred to as coding units (CUs). The four sub-blocks of larger blocks may be signaled in the following order: upleft, downleft, upright, and downright.

The following modes may be signaled at the sub-block level:
  Intra-prediction
  Skip/copy (skip index, no residual information)
  Merge (skip index, residual information)
  Inter-prediction (motion information, residual information)
  Bi-prediction (2× motion information, 2× residual information)

At frame boundaries some square blocks might not be complete. For example, for 1920×1080 resolutions, the bottom row would consist of rectangular blocks of size 64×56.

Current approaches, such as the H.265 standard, solve this by describing an implicit split, i.e., for any square block that falls outside the block boundary, a split is inferred. For the bottom part of a 1920×1080 frame, this implies that the following splits are inferred at the decoder side without signaling:
  Split the 64×56 block into two 32×32 blocks and two 32×24 blocks.
  Split each of the 32×24 blocks into two 16×16 blocks and two 16×8 blocks
  Split each of the 16×8 blocks into two 8×8 blocks.

A new scheme is presented herein. For each rectangular block, information (e.g., one bit) is sent to signal selection between: a rectangular skip/copy sub-block and a further split. For the bottom part of a 1920×1080 frame, this implies the following:
  1. For each 64×56 block, one bit is transmitted to signal a 64×56 skip/copy block or a split into two 32×32 sub-blocks and two 32×24 sub-blocks.
  2. For each 32×24 sub-block, one bit is transmitted to signal a 32×24 skip/copy sub-block or a split into two 16×16 sub-blocks and two 16×8 sub-blocks.
  3. For each 16×8 sub-block, one bit is transmitted to signal a 16×8 skip/copy sub-block or a split into two 8×8 sub-blocks.

The block and sub-block dimensions given above are only examples. It is not required that the rectangular block be 64×56, nor is it required that the smaller rectangular sub-blocks be 32×24 and 16×8. Moreover, the split indicator information may taken on a value that indicates that the rectangular block is coded using a mode that belongs to a subset of the modes allowed for a square block.

Figure 3C:
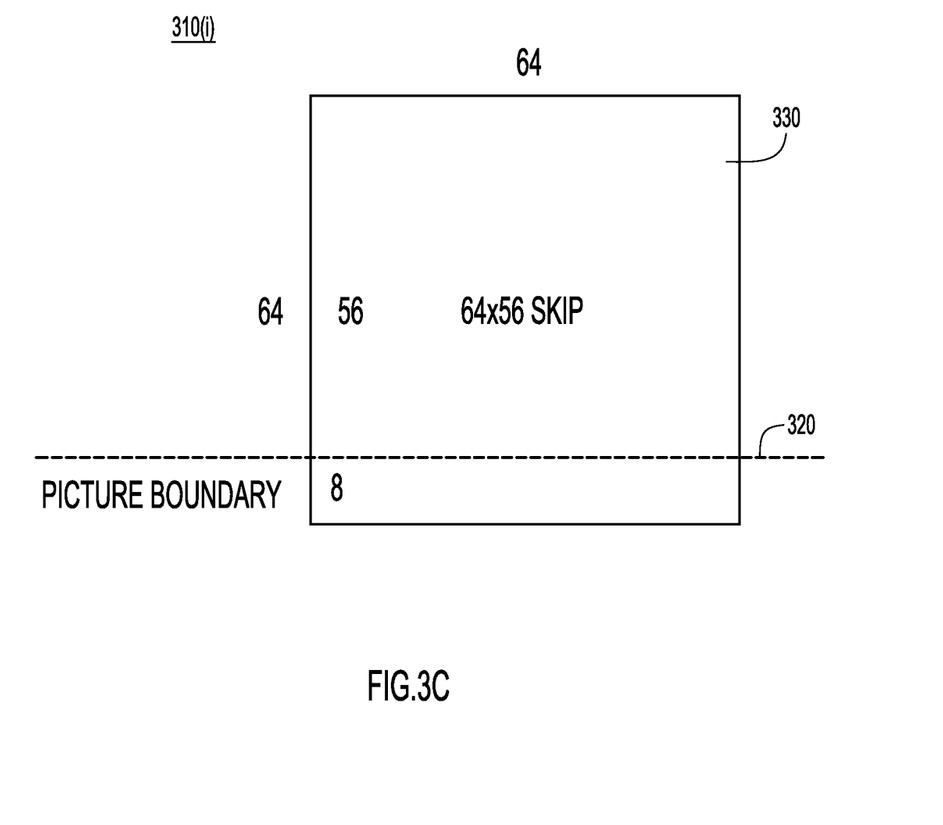
FIGS. 3C and 3D illustrate examples of rectangular block partitioning at a frame boundary, according to an example embodiment.

A first example of block partitioning at the bottom row of a 1920×1080 frame is shown in FIG. 3C. In this example, a 64×64 block 310(i) is adjacent a picture/frame boundary 320. Because the block 310(i) is adjacent to the picture/frame boundary 32, it is partitioned into rectangular 64×56 sub-block 330. In this example, the 64×56 sub-block 330 is a skip sub-block. One bit would be transmitted to signal that sub-block 330 is a skip sub-block.

Figure 3D:
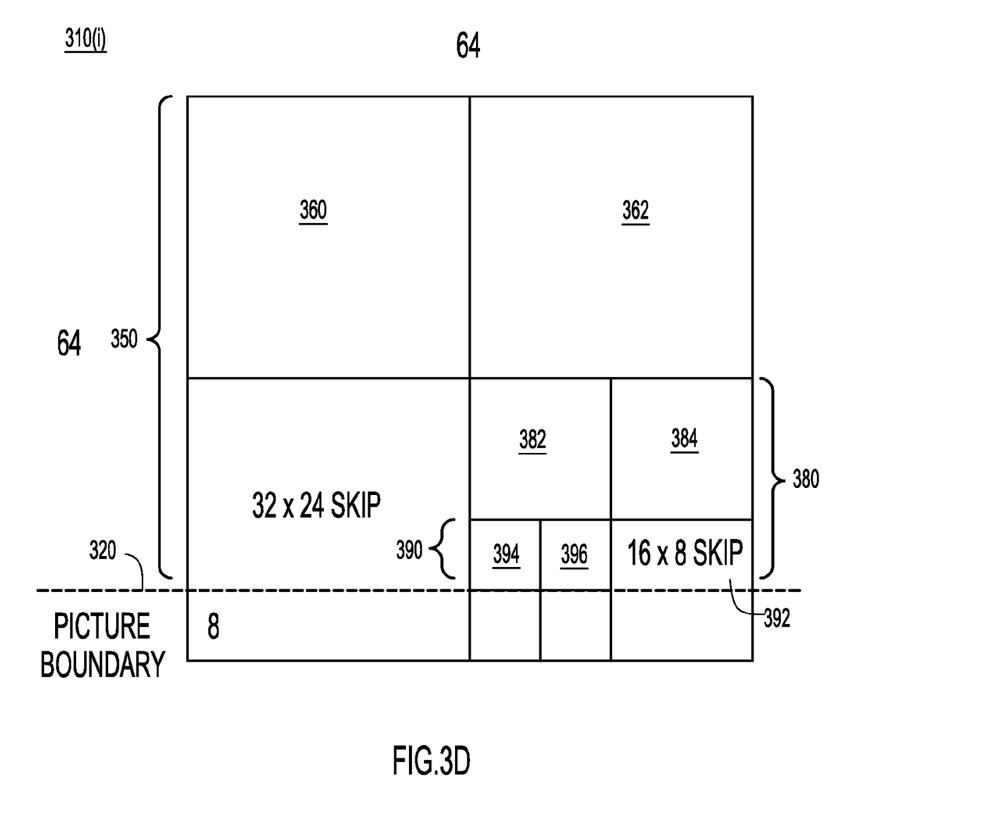

A second example is shown in FIG. 3D. In this example, a 64×64 block 310(i) is adjacent to the picture/frame boundary 320. It is therefore partitioned into a rectangular 64×56 block. The 64×56 block 350 is split into two 32×24 sub-blocks 360 and 362 and two 32×24 sub-blocks 370 and 380. One bit would be transmitted to signal the split of sub-block 350 into two 32×32 sub-blocks 360 and 362 and two 32×24 sub-blocks 370 and 380. Sub-block 380 is further split into two 16×16 sub-blocks 382 and 384, and two 16×8 sub-blocks 390 and 392. Again, one bit would be transmitted to signal the split of sub-block 380 into two 16×16 sub-blocks 382 and 384, and two 16×8 sub-blocks 390 and 392. Sub-block 390 is further split into two 8×8 sub-blocks 394 and 396. One bit would be transmitted to signal the split of sub-block 390 into two 8×8 sub-blocks 394 and 396.

The frame partitioning techniques described above in connection with FIGS. 3A-3D may be generalized such that rectangular blocks of any size are allowed at any position of a frame, and where at least one video coding parameter (of any type) may be signaled for a rectangular block. Examples of video coding parameters includes (without limitation): split indication, mode, a motion vector, a reference frame index, a coded block pattern, and transform coefficients. The mode may include skip, copy, merge, inter-prediction, bi-prediction, or intra-prediction.

Figure 4:
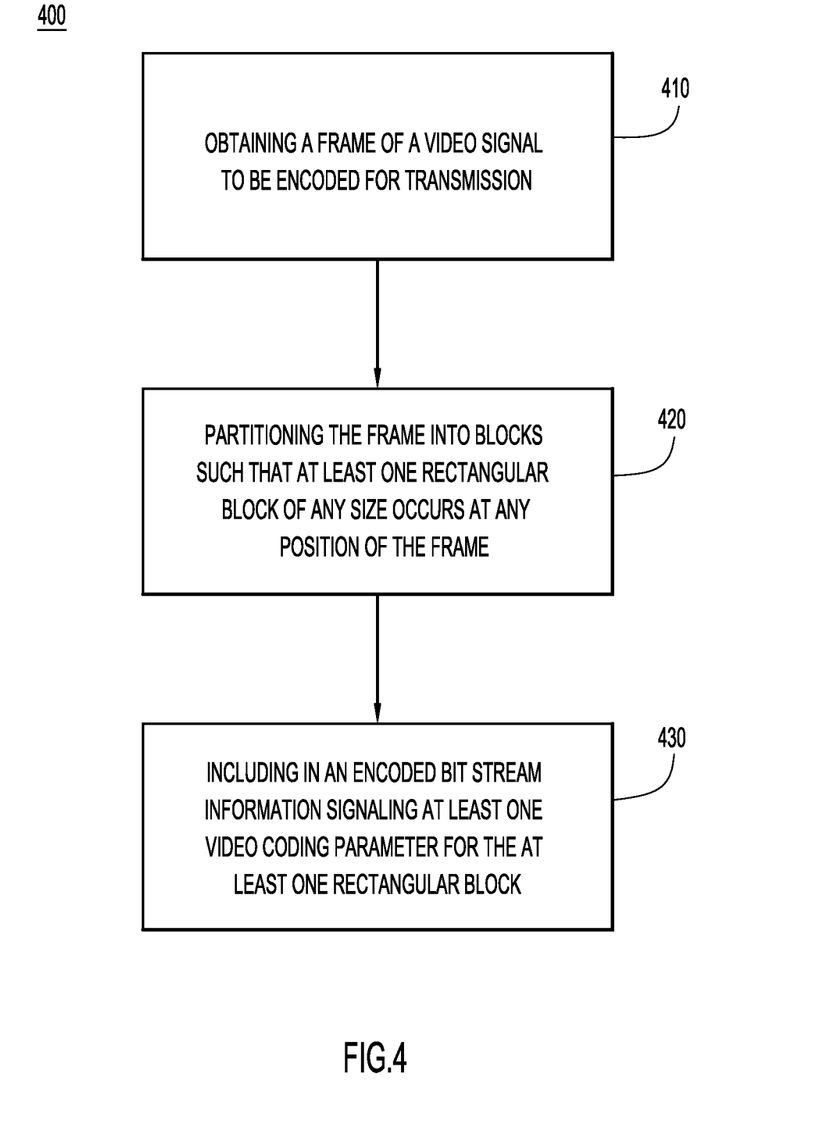
FIG. 4 is a flow chart of a video encoding method according to an example embodiment.

Reference is now made to the flow chart of FIG. 4 for a description of a video encoding method 400, according to an example embodiment. At 410, a frame of a video signal to be encoded for transmission is obtained. At 420, the frame is partitioned into blocks such that at least one rectangular block of any size occurs at any position of the frame. At 430, included in an encoded bit stream is information signaling at least one video coding parameter for the at least one rectangular block.

Figure 5:
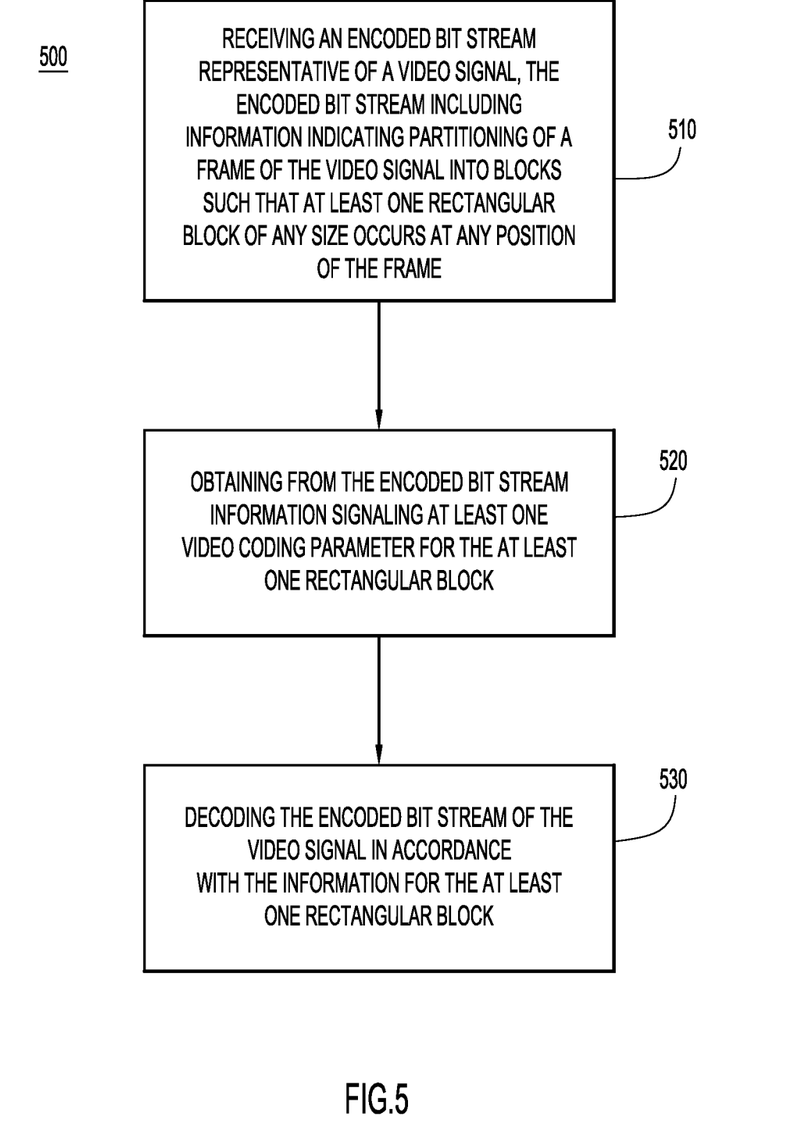
FIG. 5 is a flow chart of a video decoding method according to an example embodiment.

Turning to FIG. 5, a flow chart is now described for a video decoding method 500, according to an example embodiment. At 510, an encoded bit stream representative of a video signal is received. The encoded bit stream includes information indicating partitioning of a frame of the video signal into blocks such that at least one rectangular block of any size occurs at any position of the frame. At 520, information is obtained from the encoded bit stream that signals at least one video coding parameter for the at least rectangular block. At 530, the encoded bit stream of the video signal is decoded in accordance with the information for the at least one rectangular block.

As described above, the at least one video coding parameter includes (without limitation): split indication, mode, a motion vector, a reference frame index, a coded block pattern, and transform coefficients. The mode may include skip, copy, merge, inter-prediction, bi-prediction, or intra-prediction. The rectangular block referred to in connection with the encoding and decoding processes of FIGS. 4 and 5 may be adjacent to a boundary of the frame.

The information signaling the at least one video coding parameter is sent at the block level, because the parameter is associated with each rectangular block and different rectangular blocks can have different parameter values. The information signaling at least one video coding parameter for the at least one rectangular block may include a split indicator. When the split indicator is a first value (e.g., "true"), this may indicate that the rectangular block is further split into at least two smaller sub-blocks. At least one of the two smaller sub-blocks may be rectangular or square, all the sub-blocks may be square or all the sub-blocks may be rectangular. When the split indicator is a second value (e.g., "false"), this may indicate that the rectangular block is coded using a mode that belongs to a subset of the modes allowed for a square block. In another example, when the split indicator is "false," this may indicate that the mode of the rectangular block is either a skip or a copy. The information signaling the at least one video coding parameter may signal that the at least one rectangular block is hierarchically split into sub-blocks.

Figure 6:
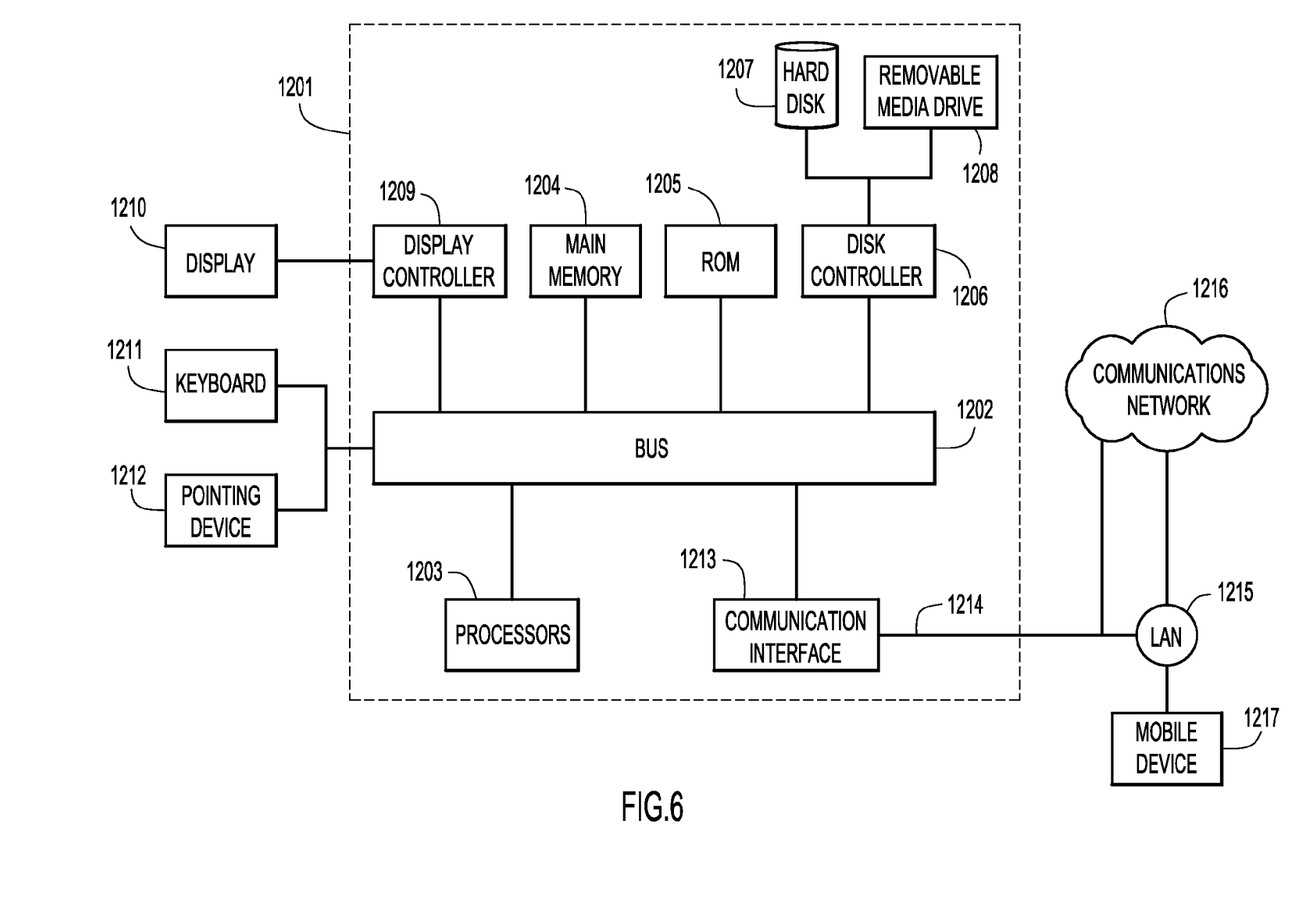
FIG. 6 is a block diagram of a computing device configured to perform the encoding and decoding techniques presented herein, according to an example embodiment.

FIG. 6 illustrates a computer system 1201 upon which an embodiment of the present invention may be implemented. The computer system 1201 may be programmed to implement a computer based device, such as a video conferencing endpoint or any device includes a video encoder or decoder for processing real time video images. The computer system 1201 includes a bus 1202 or other communication mechanism for communicating information, and a processor 1203 coupled with the bus 1202 for processing the information. While the figure shows a signal block 1203 for a processor, it should be understood that the processors 1203 represent a plurality of processing cores, each of which can perform separate processing. The computer system 1201 also includes a main memory 1204, such as a random access memory (RAM) or other dynamic storage device (e.g., dynamic RAM (DRAM), static RAM (SRAM), and synchronous DRAM (SD RAM)), coupled to the bus 1202 for storing information and instructions to be executed by processor 1203. In addition, the main memory 1204 may be used for storing temporary variables or other intermediate information during the execution of instructions by the processor 1203.

The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 1201 may also include a display controller 1209 coupled to the bus 1202 to control a display 1210, such as a cathode ray tube (CRT), for displaying information to a computer user. The computer system 1201 includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a wired or wireless network interface card to attach to any packet switched (wired or wireless) LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local are network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

In summary, in one form, a method is provided comprising: receiving an encoded bit stream representative of a video signal, the encoded bit stream including information indicating partitioning of a frame of the video signal into blocks such that at least one rectangular block of any size occurs at any position of the frame; obtaining from the encoded bit stream information signaling at least one video coding parameter for the at least one rectangular block; and decoding the encoded bit stream of the video signal in accordance with the information for the at least one rectangular block.

In another form, an apparatus is provided comprising: a communication interface configured to receive an encoded bit stream representative of a video signal, the encoded bit stream including information indicating partitioning of a frame of the video signal into blocks such that at least one rectangular block of any size occurs at any position of the frame; at least one processor configured to: obtain from the encoded bit stream information signaling at least one video coding parameter for the at least one rectangular block; and decode the encoded bit stream of the video signal in accordance with the information for the at least one rectangular block.

In still another form, a method is provided comprising: obtaining a frame of a video signal to be encoded for transmission; partitioning the frame into blocks such that at least one rectangular block of any size occurs at any position of the frame; and including in an encoded bit stream information signaling at least one video coding parameter for the at least one rectangular block.

In yet another form, one or more non-transitory computer readable storage media are provided that are encoded with instructions which, when executed by one or more processors, are operable to perform operations including: receiving an encoded bit stream representative of a video signal, the encoded bit stream including information indicating partitioning of a frame of the video signal into blocks such that at least one rectangular block of any size occurs at any position of the frame; obtaining from the encoded bit stream information signaling at least one video coding parameter for the at least one rectangular block; and decoding the encoded bit stream of the video signal in accordance with the information for the at least one rectangular block.

As described above, the at least one video coding parameter may include: split indication, mode, a motion vector, a reference frame index, a coded block pattern, and transform coefficients. The mode may include skip, copy, merge, inter-prediction, bi-prediction, or intra-prediction. The rectangular block may be adjacent to a boundary of the frame. The at least one of the two smaller sub-blocks may be rectangular, or at least one of the two smaller sub-blocks may be square. Moreover, the information may signal the at least one rectangular block is hierarchically split into sub-blocks.

When the information includes a split indicator, the split indicator may be a first value that indicates that the rectangular block is further split into at least two smaller sub-blocks. When the split indicator is a second value, this indicates that the rectangular block is coded using a mode that belongs to a subset of the modes allowed for a square block. Or, when the split indicator is a second value, this may indicate that the mode of the rectangular block is either a split or a copy.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   receiving an encoded bit stream representative of a video signal, the encoded bit stream including information indicating partitioning of a frame of the video signal into blocks such that at least one rectangular block of any size occurs at any position of the frame;
   obtaining, from the encoded bit stream, information signaling at least one video coding parameter for the at least one rectangular block, wherein the at least one video coding parameter includes a split indicator, wherein the split indicator being a first value indicates that a mode of the at least one rectangular block is a skip; and decoding the encoded bit stream of the video signal in accordance with the information signaling the at least one video coding parameter for the at least one rectangular block.

2. The method of claim 1, wherein the at least one video coding parameter further includes: a motion vector, a reference frame index, a coded block pattern, and transform coefficients.

3. The method of claim 1, wherein the split indicator being a second value indicates that the mode is a copy, merge, inter-prediction, bi-prediction, or intra-prediction.

4. The method of claim 1, wherein the at least one rectangular block is adjacent to a boundary of the frame.

5. The method of claim 1, wherein the split indicator being a second value indicates that the at least one rectangular block is further split into at least two smaller sub-blocks.

6. The method of claim 5, wherein at least one of the at least two smaller sub-blocks is rectangular.

7. The method of claim 5, wherein at least one of the at least two smaller sub-blocks is square.

8. The method of claim 1, wherein the information signaling the at least one video coding parameter signals that the at least one rectangular block is hierarchically split into sub-blocks.

9. An apparatus comprising:
a communication interface configured to receive an encoded bit stream representative of a video signal, the encoded bit stream including information indicating partitioning of a frame of the video signal into blocks such that at least one rectangular block of any size occurs at any position of the frame; and
at least one processor configured to:
obtain, from the encoded bit stream, information signaling at least one video coding parameter for the at least one rectangular block, wherein the at least one video coding parameter includes a split indicator, wherein the split indicator being a first value indicates that a mode of the at least one rectangular block is a skip; and
decode the encoded bit stream of the video signal in accordance with the information signaling the at least one video coding parameter for the at least one rectangular block.

10. The apparatus of claim 9, wherein the at least one video coding parameter further includes: a motion vector, a reference frame index, a coded block pattern, and transform coefficients.

11. The apparatus of claim 9, wherein the split indicator being a second value indicates that the mode is a copy, merge, inter-prediction, bi-prediction, or intra-prediction.

12. The apparatus of claim 9, wherein the at least one rectangular block is adjacent to a boundary of the frame.

13. The apparatus of claim 9, wherein the split indicator being a second value indicates that the at least one rectangular block is further split into at least two smaller sub-blocks.

14. A method comprising:
obtaining a frame of a video signal to be encoded for transmission;
partitioning the frame into blocks such that at least one rectangular block of any size occurs at any position of the frame; and
including, in an encoded bit stream, information signaling at least one video coding parameter for the at least one rectangular block, wherein the at least one video coding parameter includes a split indicator, wherein the split indicator being a first value indicates that a mode of the at least one rectangular block is a skip.

15. The method of claim 14, wherein the at least one video coding parameter further includes: a motion vector, a reference frame index, a coded block pattern, and transform coefficients.

16. The method of claim 14, wherein the split indicator being a second value indicates that the mode is a copy, merge, inter-prediction, bi-prediction, or intra-prediction.

17. The method of claim 14, wherein the at least one rectangular block is adjacent to a boundary of the frame.

18. The method of claim 14, wherein the split indicator being a second value indicates that the at least one rectangular block is further split into at least two smaller blocks.

19. The method of claim 18, wherein at least one of the at least two smaller sub-blocks is rectangular.

20. The method of claim 18, wherein at least one of the at least two smaller sub-blocks is square.

21. The method of claim 14, wherein the information signals that the at least one rectangular block is hierarchically split into sub-blocks.

22. The apparatus of claim 13, wherein at least one of the at least two smaller sub-blocks is rectangular.

23. The apparatus of claim 13, wherein at least one of the at least two smaller sub-blocks is square.

24. The apparatus of claim 9, wherein the information signaling the at least one video coding parameter signals that the at least one rectangular block is hierarchically split into sub-blocks.

* * * * *